(12) United States Patent
Herrick et al.

(10) Patent No.: US 11,893,655 B2
(45) Date of Patent: Feb. 6, 2024

(54) BEST EFFORT VIDEO PROCESSING

(71) Applicant: Avago Technologies International Sales Pte. Limited, Singapore (SG)

(72) Inventors: Jason W. Herrick, San Jose, CA (US); Hongtao Zhu, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 90 days.

(21) Appl. No.: 17/710,826

(22) Filed: Mar. 31, 2022

(65) Prior Publication Data

US 2023/0316448 A1 Oct. 5, 2023

(51) Int. Cl.
*G06T 1/20* (2006.01)
*G06T 1/60* (2006.01)
*G06F 9/30* (2018.01)
*G06F 9/38* (2018.01)

(52) U.S. Cl.
CPC ............ *G06T 1/20* (2013.01); *G06F 9/30105* (2013.01); *G06F 9/3836* (2013.01); *G06T 1/60* (2013.01)

(58) Field of Classification Search
CPC ......... G06T 1/20; G06T 1/60; G06F 9/30105; G06F 9/3836
USPC .................. 345/501, 545; 386/201, 326, 353
See application file for complete search history.

(56) References Cited

U.S. PATENT DOCUMENTS

| | | | |
|---|---|---|---|
| 2004/0075768 A1 | 4/2004 | Law et al. | |
| 2005/0013586 A1 | 1/2005 | Bhatia et al. | |
| 2009/0150583 A1* | 6/2009 | Guermoud | H04N 7/088 710/104 |
| 2012/0287337 A1* | 11/2012 | Kumar | G06T 7/20 348/E3.047 |
| 2017/0092236 A1* | 3/2017 | Tripathi | G09G 5/395 |
| 2018/0293697 A1 | 10/2018 | Ray et al. | |
| 2019/0130035 A1 | 5/2019 | Herrick et al. | |
| 2020/0064902 A1* | 2/2020 | Holland | G06T 1/60 |
| 2023/0196496 A1* | 6/2023 | Glen | G09G 5/363 345/581 |

OTHER PUBLICATIONS

Extended European Search Report, European Application No. 23164508.6, dated Jun. 26, 2023.

* cited by examiner

*Primary Examiner* — Jacinta M Crawford

(57) ABSTRACT

A method is provided that includes receiving a video timing pulse, determining, in response to receiving the video timing pulse, a video engine is busy processing a previous frame, and storing settings for a current frame in a pending queue in response to determining the video engine is busy processing the previous frame. The method further includes configuring the video engine with the settings for the current frame from the pending queue after the video engine has completed processing of the previous frame, and processing, using the configured video engine, the current frame.

23 Claims, 3 Drawing Sheets

BEST EFFORT VIDEO PROCESSING

TECHNICAL FIELD

The present description relates in general to video processing including, for example, processing of video frames.

BACKGROUND

Upon receiving a video timing pulse, a video processor configures a video engine for the next video frame and then processes the video frame using the configured video engine. Conventional systems may require the processing of the video frame to be completed before the next video timing pulse is received. More complex usages, such as multiple video layers, complex processing, high frame rates, etc., can make this requirement difficult to meet.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

Upon receiving a video timing pulse, a video processor configures a video engine for the next video frame and then processes the video frame using the configured video engine. Conventional systems may require the processing of the video frame to be completed before the next video timing pulse is received. Complex usages, such as multiple video layers, complex processing, high frame rates, etc., can make this requirement difficult to meet. As discussed in more detail below, the subject technology proposes to add a processing mode to a video processor that queues configuration settings for the next video frame when the previous video frame is still being processed by the video engine at the time of receiving the next video timing pulse. Once processing of the previous video frame has been completed, the video engine may be configured with the queued configuration settings and the next video frame may be processed without waiting for another video timing pulse. In this manner, a video processor may support a broad range of usages that may go beyond the complexity for which the video processor was originally designed.

Figure 1:
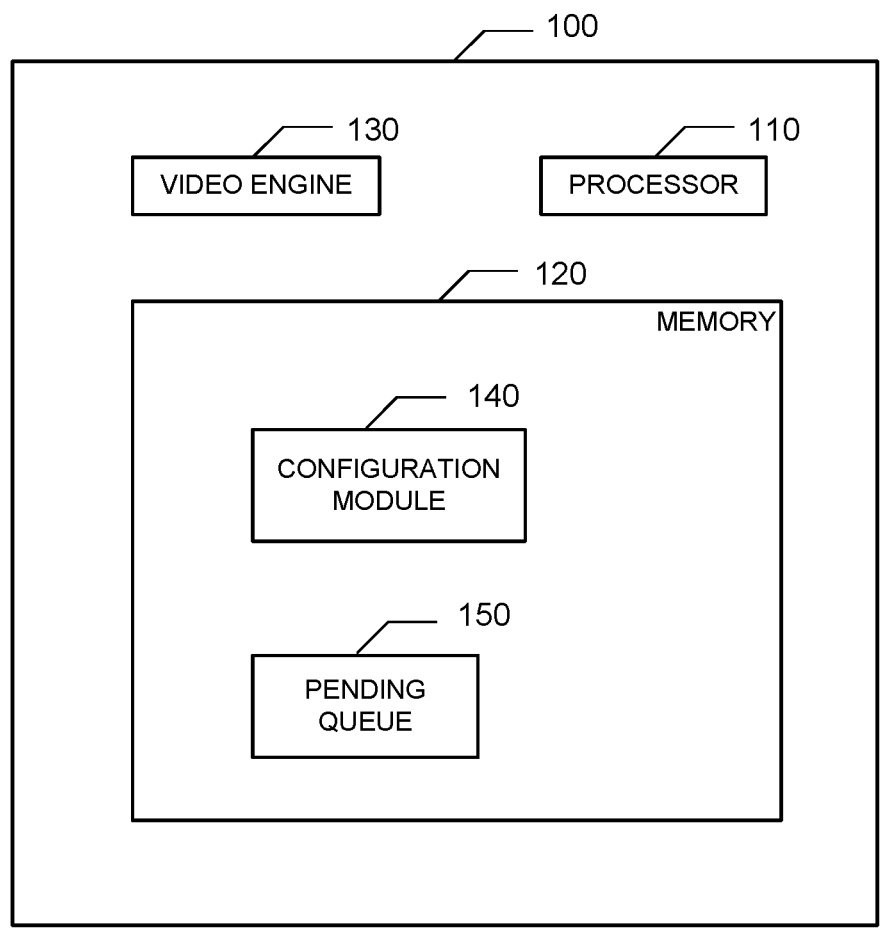
FIG. 1 is a block diagram illustrating components of a video processor according to aspects of the subject technology.

FIG. 1 is a block diagram illustrating components of a video processor according to aspects of the subject technology. Not all of the depicted components may be required, however, and one or more implementations may include additional components not shown in the figure. Variations in the arrangement, the number, and/or the type of the components may be made without departing from the spirit or scope of the claims as set forth herein. Depicted or described connections between components are not limited to direct connections and may be implemented with one or more intervening components.

In the example depicted in FIG. 1, video processor 100 includes processor 110, memory 120, and video engine 130. Processor 110 may include suitable logic, circuitry, and/or code that enable the processing of data and/or controlling operations of video processor 100. In this regard, processor 110 may be enabled to provide control signals to other components of video processor 100. Processor 110 also may control transfers of data between components of video processor 110. Additionally, processor 110 may enable implementation of an operating system or otherwise execute code to manage operations of video processor 100.

Processor 110, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Memory 120 may include suitable logic, circuitry, and/or code that enable storage of various types of information such as received data, generated data, code, and/or configuration information. Memory 120 may include, for example, random access memory (RAM), read-only memory (ROM), flash memory, and/or magnetic storage.

Video engine 130 may include suitable logic, circuitry, and/or code that enable the processing of a video frame and storing the processed video frame in a memory location from which the processed video frame is provided for display. The processing performed by video engine 130 may include scaling, de-interlacing, pixel conversion, etc. Video engine 130 may include registers and/or memory locations to which configuration settings may be loaded to control the processing performed by video engine 130. The configuration settings may include, but are not limited to, buffer location containing the frame to be processed, aspect ratio, scaling resolution, de-interlacing mode, etc.

Video engine 130, or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

As depicted in FIG. 1, memory 120 contains configuration module 140 and pending queue 150. The subject technology is not limited to these components both in number and in type, and may be implemented using other components beyond those depicted in FIG. 1.

According to aspects of the subject technology, configuration module 140 comprises a computer program having one or more sequences of instructions or code together with associated data and settings. Upon execution of the instructions or code, one or more processes are initiated to calculate configuration settings for a buffered video frame waiting to be processed, configure video engine 130 with the configuration settings for the video frame, and initiate the processing of the video frame by video engine 130. One or more processes also are initiated to check if video engine 130 is busy processing a video frame in response to receiving a video timing pulse, queuing configuration settings in pending queue 150 if video engine 130 is currently processing another video frame, and configuring video engine 130 with configuration settings from pending queue 150 after video engine 130 has completed the processing of the other video frame.

Configuration module 140 has been described as being implemented in software. Alternatively, configuration module 140 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) or a combination of software and hardware.

Pending queue 150 includes one or more registers and/or memory locations designated for storing configuration settings for one or more video frames waiting to be processed by video engine 130. While pending queue 150 is depicted as being in memory 120, pending queue 150 may be implemented as one or more registers or memory locations in a separate component of video processor 100 or integrated into another component of video processor 100 such as video engine 130, for example.

Figure 2:
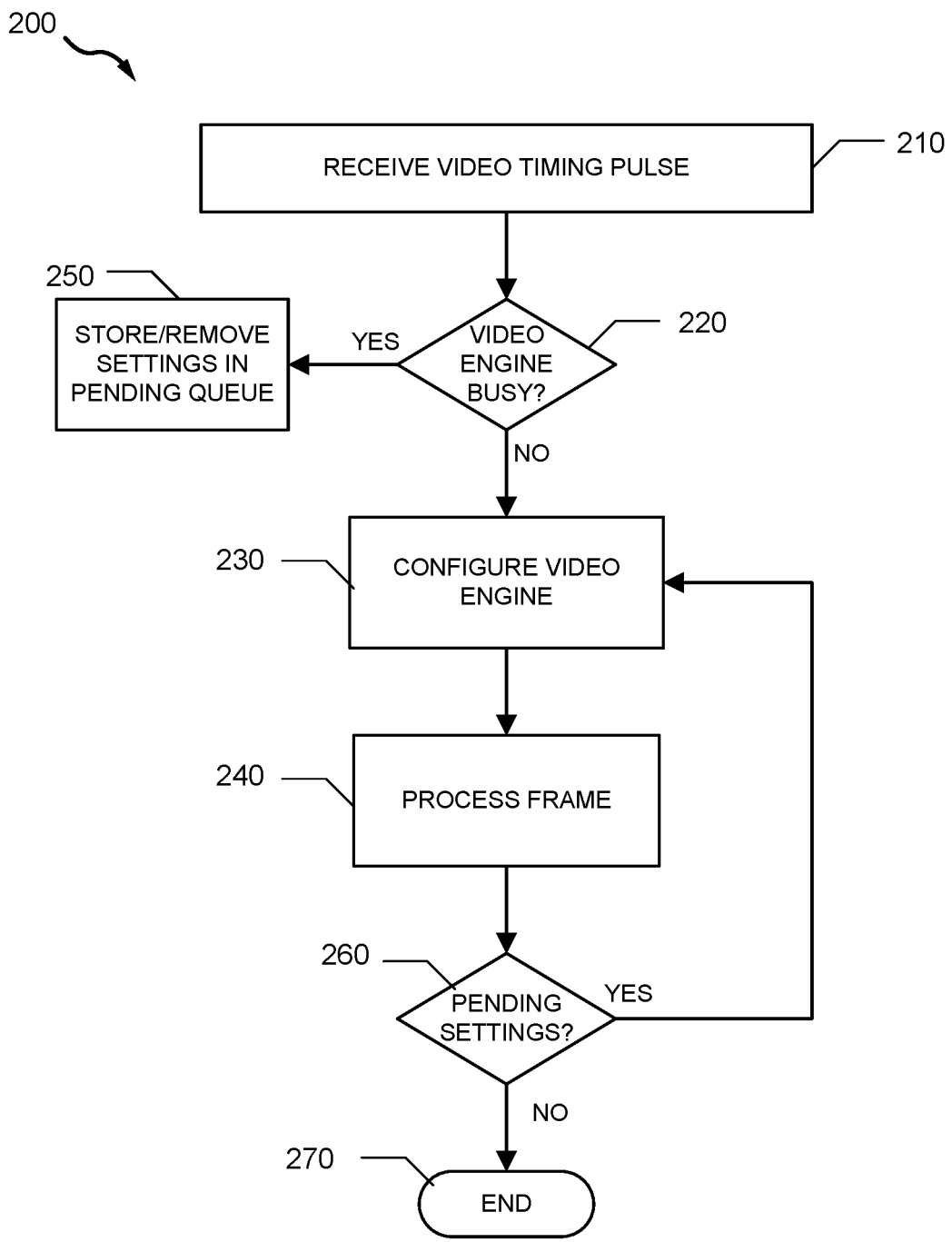
FIG. 2 is a flowchart illustrating an example process for processing video frames according to aspects of the subject technology.

FIG. 2 is a flowchart illustrating an example process for processing video frames according to aspects of the subject technology. For explanatory purposes, the blocks of process 200 are described herein as occurring in serial, or linearly. However, multiple blocks of process 200 may occur in parallel. In addition, the blocks of process 200 need not be performed in the order shown and/or one or more blocks of process 200 need not be performed and/or can be replaced by or supplemented with other operations.

Example process 200 is initiated upon the receipt of a video timing pulse (block 210). The video timing pulse indicates that a video frame from video buffers needs to be processed. The video timing pulse may be generated at a frame rate of the video engine output. For example, the video timing pulse may be generated at 60 Hz, 50 Hz, 24 Hz, etc. The video timing pulse also may be used to sample time-stamps for lip-sync, trick-modes, etc. The video timing pulse may be an interrupt or a custom construct such as a trigger.

In response to receiving the video timing pulse, process 200 continues by determining if the video engine is busy processing a previous video frame (block 220). According to aspects of the subject technology, the busy status of the video engine may be determined by checking to see if a flag has been set. For example, a busy flag may be set when the video engine is configured for processing a video frame and cleared when the video engine has completed processing the video frame. The busy flag may be a register or memory location in which a first value is stored to indicate that the video engine is configured for processing a video frame and a second value is stored to indicate that the video engine has completed processing the video frame.

If the video engine is not busy processing another video frame (block 220), process 200 proceeds like a standard video processing process and configures the video engine with configuration settings calculated for the current video frame waiting to be processed (block 230) and the video engine processes the current video frame (block 240). The processed video frame may then be placed in a buffer from which it is subsequently provided for display.

If the video engine is determined to be busy, the configuration settings calculated for the current video frame waiting to be processed may be stored in a pending queue (block 250). When the video engine completes the processing of the previous video frame (block 240), process 200 determines if configuration settings have been stored in the pending queue (block 260). If the pending queue contains configuration settings for a video frame waiting to be processed, the video engine is configured using the configuration settings from the pending queue (block 230) and the video frame is processed by the video engine (block 240). The configuration settings are then removed from the pending queue. If process 200 determines that there are no configuration settings in the pending queue (block 260), process 200 ends (block 270) until the next video timing pulse is received (block 210).

Before storing configuration settings in the pending queue, process 200 may determine if configuration settings for another video frame are currently stored in the pending queue. If process 200 determines that configuration settings for an intermediate video frame (e.g., a video frame that follows the video frame being processed and precedes the current video frame waiting to be processed in a sequence of video frames) are stored in the pending queue, the configuration settings for processing the intermediate video frame may be removed from the pending queue and replaced with the configuration settings for the current video frame (block 250). In this situation, the intermediate video frame is dropped and not processed for display. Alternatively, the configuration settings for processing the intermediate video frame may be left in the pending queue and the configuration settings for the current video frame and the current video frame may be dropped and not processed for display. In yet another alternative, the configuration settings for the current video frame may not be added to the pending queue after the configuration settings for the intermediate video frame are removed, and both the intermediate video frame and the current video frame may be dropped (block 250). Process 200 would then start again upon receiving a subsequent video timing pulse (block 210).

Alternatively, if process 200 determines that configuration settings for an intermediate frame are stored in the pending queue, the configuration settings for the current video frame may be added to the pending queue as part of a linked list, for example. In this situation, the video engine may be configured with configuration settings for the intermediate video frame and process the intermediate video frame first. After the intermediate video frame has been processed, the video engine may be configured with configuration settings for the current video frame and process the current video frame. The pending queue may have a limit to the number of configuration settings that may be stored therein. For example, only two sets of configuration settings may be stored at a time with the oldest configuration settings being dropped when new configuration settings are stored in the pending queue.

The foregoing description has described the processing of video frames. However, the subject technology is not limited to the processing of video frames. For example, the same structures and processes described above may be used to process graphics frames and/or a combination of graphics and video frames.

Figure 3:
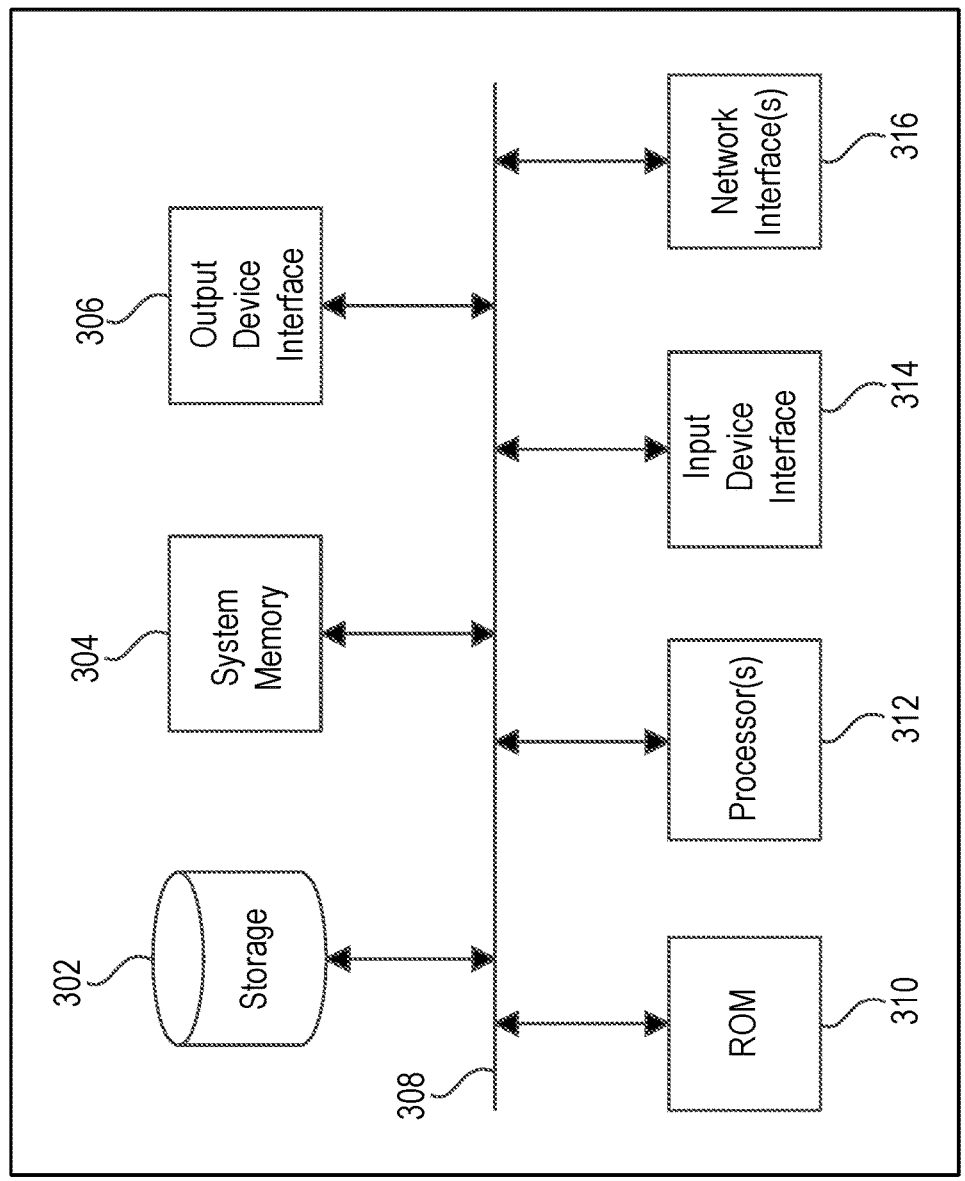
FIG. 3 is a block diagram illustrating components of an electronic system 300 with which one or more implementations of the subject technology may be implemented.

FIG. 3 is a block diagram illustrating components of an electronic system 300 with which one or more implementations of the subject technology may be implemented. The electronic system 300, for example, can be a set-top box, a smart television, a media converter, a desktop computer, a laptop computer, a tablet computer, a phone, or generally any electronic device that processes video streams for display. Such an electronic system 300 includes various types of computer readable media and interfaces for various other types of computer readable media. According to aspects of the subject technology, electronic system 300 may be used to implement video processor 100 described with respect to FIG. 1. The electronic system 300 includes a bus 308, one or more processing unit(s) 312, a system memory 304, a read-only memory (ROM) 310, a permanent storage device 302, an input device interface 314, an output device interface 306, and a network interface 316, or subsets and variations thereof.

The bus 308 collectively represents all system, peripheral, and chipset buses that communicatively connect the numerous internal devices of the electronic system 300. In one or more implementations, the bus 308 communicatively connects the one or more processing unit(s) 312 with the ROM 310, the system memory 304, and the permanent storage device 302. From these various memory units, the one or more processing unit(s) 312 retrieves instructions to execute and data to process in order to execute the processes of the subject disclosure. The one or more processing unit(s) 312 can be a single processor or a multicore processor in different implementations.

The ROM 310 stores static data and instructions that are needed by the one or more processing unit(s) 312 and other modules of the electronic system. The permanent storage device 302, on the other hand, is a read-and-write memory device. The permanent storage device 302 is a non-volatile memory unit that stores instructions and data even when the electronic system 300 is off. One or more implementations of the subject disclosure use a mass-storage device (such as a magnetic or optical disk and its corresponding disk drive) as the permanent storage device 302.

Other implementations use a removable storage device (such as a flash memory drive, optical disk and its corresponding disk drive, external magnetic hard drive, etc.) as the permanent storage device 302. Like the permanent storage device 302, the system memory 304 is a read-and-write memory device. However, unlike the permanent storage device 302, the system memory 304 is a volatile read-and-write memory, such as random access memory. System memory 304 stores any of the instructions and data that the one or more processing unit(s) 312 needs at runtime. In one or more implementations, the processes of the subject disclosure are stored in the system memory 304, the permanent storage device 302, and/or the ROM 310. From these various memory units, the one or more processing unit(s) 312 retrieves instructions to execute and data to process in order to execute the processes of one or more implementations.

The bus 308 also connects to the input device interface 314 and the output device interface 306. The input device interface 314 enables a user to communicate information and select commands to the electronic system. Input devices used with the input device interface 314 include, for example, alphanumeric keyboards and pointing devices (also called "cursor control devices"). The output device interface 306 enables, for example, the display of images generated by the electronic system 300. Output devices used with the output device interface 306 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 3, the bus 308 also couples the electronic system 300 to one or more networks (not shown) through one or more network interfaces 316. In this manner, the computer can be a part of one or more network of computers (such as a local area network (LAN), a wide area network (WAN), or an Intranet, or a network of networks, such as the Internet). Any or all components of the electronic system 300 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multicore processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself According to aspects of the subject technology, a method is provided that includes receiving a video timing pulse, determining, in response to receiving the video timing pulse, a video engine is busy processing a previous frame, and storing settings for a current frame in a pending queue in response to determining the video engine is busy processing the previous frame. The method further includes configuring the video engine with the settings for the current frame from the pending queue after the video engine has completed processing of the previous frame, and processing, using the configured video engine, the current frame.

The method may further include determining settings for an intermediate frame are stored in the pending queue, and removing the settings for the intermediate frame from the pending queue without processing the intermediate frame. The method may further include determining settings for an intermediate frame are stored in the pending queue, configuring the video engine with the settings for the intermediate frame from the pending queue, and processing, using the configured video engine, the intermediate frame, wherein the intermediate frame is processed before configuring the video engine with the settings for the current frame and processing the current frame.

Determining that the video engine is busy may include determining that a busy flag is set. The busy flag may be set when configuring the video engine. The busy flag may be cleared after the video engine has completed processing of the current frame.

The method may further include determining the pending queue contains settings for a subsequent frame after the video engine has completed processing of the current frame, configuring the video engine with the settings for the subsequent frame, and processing, using the configured video engine, the subsequent frame. The pending queue may be determined to contain the settings for the subsequent frame and the video engine may be configured with the settings for the subsequent frame prior to receiving a subsequent video timing pulse. The video timing pulse may be received at a set frame rate.

According to aspects of the subject technology, a non-transitory computer-readable medium is provided that stores instructions which when executed by one or more processors, cause the one or more processors to perform operations. The operations include receiving a video timing pulse, determining, in response to receiving the video timing pulse, a video engine is busy processing a previous frame, and storing settings for a current frame in a pending queue in response to determining the video engine is busy processing the previous frame. The operations further include configuring the video engine with the settings for the current frame from the pending queue after the video engine has completed processing of the previous frame, and processing, using the configured video engine, the current frame.

The operations may further include determining that settings for an intermediate frame are stored in the pending queue, and removing the settings for the intermediate frame from the pending queue without processing the intermediate frame. The operations may further include determining settings for an intermediate frame are stored in the pending queue, configuring the video engine with the settings for the intermediate frame from the pending queue, and processing, using the configured video engine, the intermediate frame, wherein the intermediate frame is processed before configuring the video engine with the settings for the current frame and processing the current frame.

The operations may further include determining the pending queue contains settings for a subsequent frame after the video engine has completed processing of the current frame, configuring the video engine with the settings for the subsequent frame, and processing, using the configured video engine, the subsequent frame. The pending queue may be determined to contain the settings for the subsequent frame and the video engine may be configured with the settings for the subsequent frame prior to receiving a subsequent video timing pulse.

According to aspects of the subject technology, a video processor is provided that includes a video engine, a memory storing one or more computer programs, and one or more processors configured to execute instructions of the one or more computer programs. The instructions are executed to receive a video timing pulse, determine, in response to receiving the video timing pulse, the video engine is busy processing a previous frame, and store settings for a current frame in a pending queue in response to determining the video engine is busy processing the previous frame. The instructions are further executed to configure the video engine with the settings for the current frame from the pending queue after the video engine has completed processing of the previous frame, and process, using the configured video engine, the current frame.

The instructions may be executed to determine settings for an intermediate frame are stored in the pending queue, and remove the settings for the intermediate frame from the pending queue without processing the intermediate frame. The instructions may be executed to determine settings for an intermediate frame are stored in the pending queue, configure the video engine with the settings for the intermediate frame from the pending queue, and process, using the configured video engine, the intermediate frame, wherein the intermediate frame is processed before configuring the video engine with the settings for the current frame and processing the current frame.

The instructions may be executed to determine that the pending queue contains settings for a subsequent frame after the video engine has completed processing of the current frame, configure the video engine with the settings for the subsequent frame, and process, using the configured video engine, the subsequent frame. The pending queue may be determined to contain the settings for the subsequent frame and the video engine may be configured with the settings for the subsequent frame prior to receiving a subsequent video timing pulse. The video engine may be configured with the settings for the current frame prior to receiving a subsequent video timing pulse.

According to aspects of the subject technology, a method is provided that includes receiving a video timing pulse and determining, in response to receiving the video timing pulse, a video engine is busy processing a previous frame. The method further includes determining settings for an intermediate frame are stored in a pending queue, removing the settings for the intermediate frame from the pending queue without processing the intermediate frame, and dropping settings for a current frame without processing the current frame.

The method may further include receiving a subsequent video timing pulse, configuring a video engine with settings for a subsequent frame following the current frame, and processing, using the configured video engine, the subsequent frame. The method may further include determining, in response to receiving the subsequent video timing pulse, the video engine is busy processing the previous frame, and storing settings for the subsequent frame in the pending queue in response to determining the video engine is busy processing the previous frame. The video engine may be configured with settings for the subsequent frame from the pending queue after the video engine has completed processing of the previous frame.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A method, comprising:
   receiving a video timing pulse;
   determining, in response to receiving the video timing pulse, a video engine is busy processing a previous frame;
   storing settings for a current frame in a pending queue in response to determining the video engine is busy processing the previous frame;
   configuring the video engine with the settings for the current frame from the pending queue after the video engine has completed processing of the previous frame; and
   processing, using the configured video engine, the current frame.

2. The method of claim 1, further comprising:
   determining settings for an intermediate frame are stored in the pending queue; and
   removing the settings for the intermediate frame from the pending queue without processing the intermediate frame.

3. The method of claim 1, further comprising:
   determining settings for an intermediate frame are stored in the pending queue;
   configuring the video engine with the settings for the intermediate frame from the pending queue; and
   processing, using the configured video engine, the intermediate frame,
   wherein the intermediate frame is processed before configuring the video engine with the settings for the current frame and processing the current frame.

4. The method of claim 1, wherein determining the video engine is busy comprises determining that a busy flag is set.

5. The method of claim 4, further comprising setting the busy flag when configuring the video engine.

6. The method of claim 5, further comprising clearing the busy flag after the video engine has completed processing of the current frame.

7. The method of claim 1, further comprising:
   determining the pending queue contains settings for a subsequent frame after the video engine has completed processing of the current frame;

configuring the video engine with the settings for the subsequent frame; and processing, using the configured video engine, the subsequent frame.

8. The method of claim 7, wherein the pending queue is determined to contain the settings for the subsequent frame and the video engine is configured with the settings for the subsequent frame prior to receiving a subsequent video timing pulse.

9. The method of claim 1, wherein the video timing pulse is received at a set frame rate.

10. A non-transitory computer-readable medium storing instructions which when executed by one or more processors, cause the one or more processors to perform operations comprising:

receiving a video timing pulse;

determining, in response to receiving the video timing pulse, a video engine is busy processing a previous frame;

storing settings for a current frame in a pending queue in response to determining the video engine is busy processing the previous frame;

configuring the video engine with the settings for the current frame from the pending queue after the video engine has completed processing of the previous frame; and processing, using the configured video engine, the current frame.

11. The non-transitory computer-readable medium of claim 10, wherein the operations further comprise:

determining settings for an intermediate frame are stored in the pending queue; and removing the settings for the intermediate frame from the pending queue without processing the intermediate frame.

12. The non-transitory computer-readable medium of claim 10, wherein the operations further comprise:

determining settings for an intermediate frame are stored in the pending queue;

configuring the video engine with the settings for the intermediate frame from the pending queue; and processing, using the configured video engine, the intermediate frame, wherein the intermediate frame is processed before configuring the video engine with the settings for the current frame and processing the current frame.

13. The non-transitory computer-readable medium of claim 10, wherein the operations further comprise:

determining the pending queue contains settings for a subsequent frame after the video engine has completed processing of the current frame;

configuring the video engine with the settings for the subsequent frame; and processing, using the configured video engine, the subsequent frame.

14. The non-transitory computer-readable medium of claim 13, wherein the pending queue is determined to contain the settings for the subsequent frame and the video engine is configured with the settings for the subsequent frame prior to receiving a subsequent video timing pulse.

15. A video processor, comprising:

a video engine;

a memory storing one or more computer programs; and one or more processors configured to execute instructions of the one or more computer programs to:

receive a video timing pulse;

determine, in response to receiving the video timing pulse, the video engine is busy processing a previous frame;

store settings for a current frame in a pending queue in response to determining the video engine is busy processing the previous frame;

configure the video engine with the settings for the current frame from the pending queue after the video engine has completed processing of the previous frame; and process, using the configured video engine, the current frame.

16. The video processor of claim 15, wherein the one or more processors are further configured to execute instructions of the one or more computer programs to:

determine settings for an intermediate frame are stored in the pending queue; and remove the settings for the intermediate frame from the pending queue without processing the intermediate frame.

17. The video processor of claim 15, wherein the one or more processors are further configured to execute instructions of the one or more computer programs to:

determine settings for an intermediate frame are stored in the pending queue;

configure the video engine with the settings for the intermediate frame from the pending queue; and process, using the configured video engine, the intermediate frame, wherein the intermediate frame is processed before configuring the video engine with the settings for the current frame and processing the current frame.

18. The video processor of claim 15, wherein the one or more processors are further configured to execute instructions of the one or more computer programs to:

determine the pending queue contains settings for a subsequent frame after the video engine has completed processing of the current frame;

configure the video engine with the settings for the subsequent frame; and process, using the configured video engine, the subsequent frame.

19. The video processor of claim 18, wherein the pending queue is determined to contain the settings for the subsequent frame and the video engine is configured with the settings for the subsequent frame prior to receiving a subsequent video timing pulse.

20. The video processor of claim 15, wherein the video engine is configured with the settings for the current frame prior to receiving a subsequent video timing pulse.

21. A method, comprising:

receiving a video timing pulse;

determining, in response to receiving the video timing pulse, a video engine is busy processing a previous frame;

determining settings for an intermediate frame are stored in a pending queue;

removing the settings for the intermediate frame from the pending queue without processing the intermediate frame; and dropping settings for a current frame without processing the current frame.

22. The method of claim 21, further comprising:

receiving a subsequent video timing pulse;

configuring the video engine with settings for a subsequent frame following the current frame; and processing, using the configured video engine, the subsequent frame.

23. The method of claim 22, further comprising:

determining, in response to receiving the subsequent video timing pulse, the video engine is busy processing the previous frame; and storing settings for the subsequent frame in the pending queue in response to determining the video engine is busy processing the previous frame, wherein the video engine is configured with settings for the subsequent frame from the pending queue after the video engine has completed processing of the previous frame.

\* \* \* \* \*